United States Patent [19]

Franklin et al.

[11] Patent Number: 4,953,157
[45] Date of Patent: Aug. 28, 1990

[54] PROGRAMMABLE DATA PACKET BUFFER PRIORITIZATION ARRANGEMENT

[75] Inventors: Andrew D. Franklin, Boulder; Robert J. Gallegos, Westminster, both of Colo.

[73] Assignee: American Telephone and Telegraph Company, Murray Hill, N.J.

[21] Appl. No.: 340,623

[22] Filed: Apr. 19, 1989

[51] Int. Cl.$^5$ ............................................. H04Q 11/04
[52] U.S. Cl. ..................................... 370/60; 370/85.6; 370/94.1
[58] Field of Search ...................... 375/94; 370/94, 60, 370/94.1, 85.4, 60, 60.1, 61, 85.6; 364/200; 340/825.5

[56] References Cited

U.S. PATENT DOCUMENTS

| | | | |
|---|---|---|---|
| 4,159,518 | 6/1979 | Draper et al. | 364/200 |
| 4,400,771 | 8/1983 | Suzuki et al. | 364/200 |
| 4,507,760 | 3/1985 | Fraser | 365/221 |
| 4,644,533 | 2/1987 | Braff et al. | 370/60 |
| 4,692,894 | 9/1987 | Bemis | 370/84 |
| 4,731,785 | 3/1988 | Ferenc et al. | 370/60 |
| 4,769,810 | 9/1988 | Eckberg, Jr. et al. | 370/60 |
| 4,819,229 | 4/1989 | Pritty et al. | 370/89 |

OTHER PUBLICATIONS

*IEEE Intl Computer Society Conf.*, Boston, Mass., 1971, Sept. 22–24, "A scheme for Dynamic Priority Control in Demand Actuated Multiplexing", P. W. Ward, pp. 51–52.

*Proceedings of the 2nd Symposium on Problems in the Optimization of Data Communications Systems*, Oct. 20–22, 1971, "A Preemptive Priority Model With Two Clases of Customers" M. Segal, p. 168–174.

*IEEE Intl. Conf. on Communication*, 1973, "Integrated Communication System Performance", D. Maiwald et al., pp. 24.13–21.

*Primary Examiner*—Douglas W. Olms
*Assistant Examiner*—Tesfaldet Bocure
*Attorney, Agent, or Firm*—Frederick B. Luludis

[57] ABSTRACT

In a packet network, each data packet that is transported through the network to a destination node is assigned one of 2**N priority levels based on the type of information contained in the data packet. A data packet containing system control information is assigned the highest priority level. A data packet containing, for example, user information, is assigned a lower priority level. In addition, each priority level is associated with a respective "watermark" threshold. When a data packet arrives at a network node, the node compares the packet's associated watermark threshold with the number of data words currently stored in a common memory. The node rejects the packet if the watermark threshold is found to be less than that number to reserve space in the memory for data packets of higher priority. Otherwise, the data packet is stored in the common memory.

9 Claims, 3 Drawing Sheets

PROGRAMMABLE DATA PACKET BUFFER PRIORITIZATION ARRANGEMENT

FIELD OF THE INVENTION

The invention relates to an arrangement for storing a data word in a buffer memory, and more particularly relates to an arrangement which either stores an incoming data word in memory or discards the data word based on the priority level of the data word.

BACKGROUND OF THE INVENTION

In a packet switched network it is more economical to store system control packets and client data packets in a common buffer, rather than in dedicated buffers. However, it is possible that a common buffer could overflow during periods of heavy data traffic, thereby resulting in the loss of one or more system control packets. A loss of a system control packet could lead to a degradation in the performance and reliability of the packet switched network.

SUMMARY OF THE INVENTION

The chance of possibly losing a system control packet due to a buffer overflow condition is greatly reduced by ensuring that sufficient space is reserved in a common buffer for the storage of system control packets. Specifically, each incoming packet is assigned one of $2^{**}N$ priority levels, with the highest level of priority being assigned to system control packets. In addition, so-called "watermark" thresholds in the common buffer, which may be programmed, or set, by the user, are associated with respective priority levels. Thus, when a packet is received at a network node, the watermark threshold associated with the packet's priority level is compared with the number of buffer memory locations that are filled. The packet is discarded if its associated watermark threshold is found to be below that number to reserve space in the buffer for packets of higher priority. Otherwise, the packet is stored in the buffer memory.

GENERAL DESCRIPTION

Figure 1:
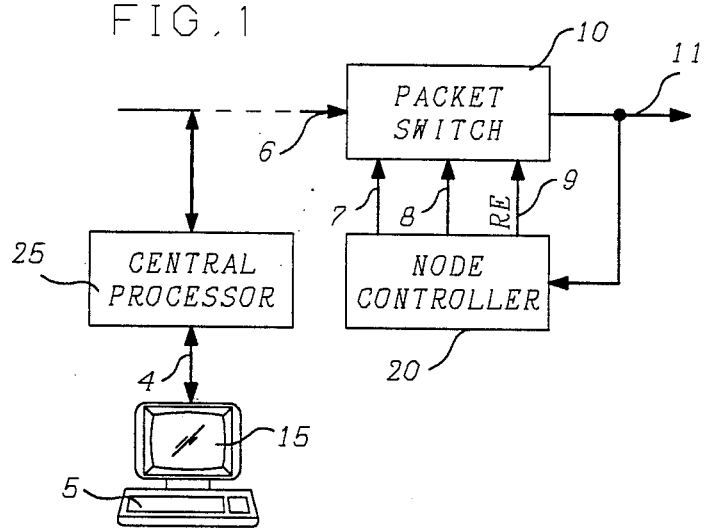
FIG. 1 is a broad block diagram of a packet switch node in which the invention may be advantageously practiced.

FIG. 1 illustrates a broad diagram of a packet switch node comprising, inter alia, packet switch 10, node controller 20 and a data terminal 15 communicating with central processor 25 via bus 4. The overall operation of a switching node employing packet switch 10 is disclosed in U.S. Pat. No. 4,731,785 issued Mar. 15, 1988 J. F. Ferenc et al, which is hereby incorporated by reference. Packet switch 10 is shown connected to node controller 20 via a data bus 7, cable 8 and read enable lead 9. The function of the latter connections will be discussed below in detail. However, it suffices to say that read enable lead 9 is used to output to bus 11 information that is stored in a buffer memory of packet switch 10. Bus 7 and the leads of cable 8 are used, on the other hand, to change the values of respective watermark thresholds stored in packet switch 10. The watermark thresholds may be inputted by, for example, a system administrator operating keyboard 5 of terminal 15, which is in communication with central processor 25 via bus 4. Central processor 25, in turn, encapsulates the watermark thresholds in a data packet and transmits the latter to packet switch 10 via bus 6. Controller 20 which ultimately receives the data packet unloads the new watermark thresholds from the data packet and stores them in packet switch 10, as will be discussed below.

Specifically, packet switch 10 employs circuitry for storing in its buffer memory information received via bus 6. Such information may be a data packet comprising a plurality of data bytes, in which each data byte is stored in the buffer memory in the order in which it is received. Similarly, each data byte is outputted to bus 11 in the order in which it was stored in the buffer memory. That is, packet switch 10 functions as a first-in, first-out (FIFO) queue.

Packet switch 10 may also be thought of as being a circular storage device, in which the data bytes of a packet are stored sequentially at buffer memory locations $0,1,2,\ldots N-1$, respectively, where N denotes the number of data bytes that may be stored in packet switch 10. After the location with address $N-1$ has been filled, then the next location to be filled will be address 0. Accordingly, successive buffer memory locations may be addressed using modulo N arithmetic, in which it is packet switch 10 which supplies the write and read addresses. Packet switch 10 thus maintains an internal write pointer register containing the address of the next available buffer memory location to be filled, and maintains a read pointer register containing the address of the next buffer memory location to be read.

Packet switch 10 also uses the contents of its read and write pointer registers to calculate the number of buffer memory locations that are filled, i.e., contain data bytes which have not yet been outputted to bus 11. Packet switch 10 makes this calculation each time it stores an incoming data byte in th buffer memory. However, in accordance with the invention, the data byte is stored in the buffer memory only if the calculated number is less than a watermark threshold associated with the priority level of the data byte. As will be shown below, the priority level of a data byte is the priority level that is assigned to the data pcket containing the data byte.

It is noted that in a preferred embodiment of the invention, packet switch 10 does not use the result of the foregoing determination until all of the data bytes of a packet have been stored in the memory buffer. Packet switch 10 operates in this manner so that it does not store a leading number of data bytes of an incoming packet in the buffer memory and then discard the remaining data bytes of the packet.

(It is noted at this point that the act of discarding a packet does not mean that the packet is lost. For example, it is well-known in the art of data transmission that a sender will retransmit a data packet if it fails to receive an acknowledgement from the intended recipient.)

As will be shown below, a data packet contains a so-called class-of-service mark, or indicator, which identifies the packet's level of priority. Packet switch 10, in accordance with an aspect of the invention, uses the class-of-service mark to derive the applicable watermark threshold, that is, the "fill" level in the buffer above which packet of the respective class of service cannot be stored.

In a preferred embodiment of the invention, two bits of a data byte are reserved to define a packet's traveling class-of-service mark, and, hence, its priority level. Since two binary bits may be used to define $2^2$, or four binary states, namely, 00, 01, 10 and 11, a packet's priority may then be one of four levels each associated with a respective watermark threshold in the buffer. In an illustrative embodiment of the invention, only two priority levels are used. For example, a user packet, such as a data packet generated by a user, is assigned level 10 and a system control packet is assigned level 11.

DETAILED DESCRIPTION

Figure 2:
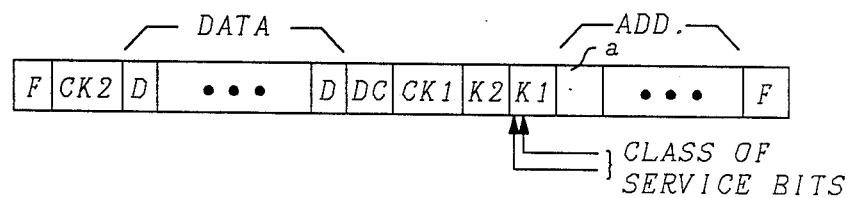
FIG. 2 illustrates the layout of the fields of a data packet transmitted and received by the node of FIG. 1.

Before discussing the way in which packet switch 10 implements the invention, it would be best to discuss the structure of a data packet, as shown in FIG. 2. Specifically, a flag (F) comprising a predetermined pattern of binary bits precedes the first data byte of a packet. Within the system of FIG. 1, the number of bits in a data byte is—illustratively eight bits—, and the pattern of flag F is 01111110. The first field (ADD) of a packet comprises a variable number of 8-bit address bytes, which define the address of the recipient's network node. Each byte in the ADD field uses seven of the eight bits. The remaining bit, bit zero, is used to identify the end of the ADD field. That is, bit zero of the last byte "a" of that field is set to a binary one. Whereas, bit zero of each of the preceding bytes in the ADD field is set to a binary zero.

The following field, the key (K) field identifies the recipient of the packet, i.e., a data terminal. The last two bits of the first byte (K1) of the K field contain the packet's so-called traveling class-of-service mark. As mentioned above, it is these bits which are used to determine the packet's associated watermark threshold.

The CK1 field is a checksum taken over the ADD and K fields. The contents of the DC field is used to identify the logical link presented to the device addressed by the ADD and K fields. The data field (D) is of variable length and may contain up to 260 data bytes. The final field, CK2 is a checksum taken over the DC and data fields. It is seen from the FIG. 2 that the last field of a packet is followed by the aforementioned F flag, which is used to identify the end of the packet.

Figure 3:
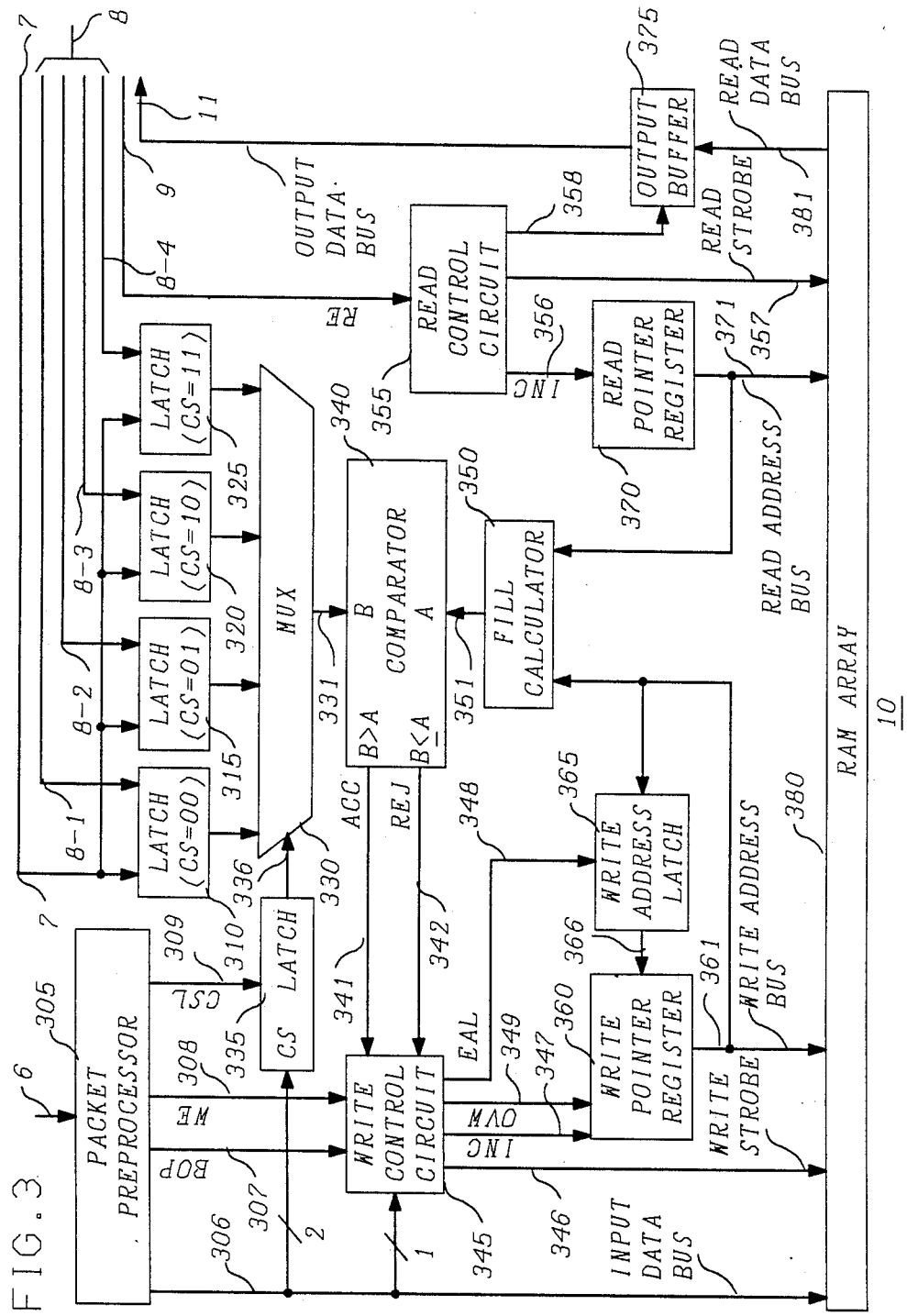
FIG. 3 is a broad block diagram of the packet switch of FIG. 1 embodying the principles of the invention.

With the foregoing in mind, we now turn to a discussion of the manner in which the invention is implemented in packet switch 10, as shown in FIG. 3.

In particular, preprocessor circuit 305 responsive to receipt of a data byte via bus 6 checks the pattern of the bits contained therein to see if they conform with the pattern of the aforementioned F flag. Preprocessor 305 discards the data byte if it finds that to be the case. Otherwise, it temporarily stores the byte in a holding register contained in preprocessor 305. The data byte stored in the holding register is the first byte of an incoming data packet, i.e., the first byte of the ADD field. At this point, preprocessor 305 checks to see if bit 0 of the data byte is set, thereby noting the end of the ADD field.

Assuming that bit 0 is not set, then on receipt of the next data byte, preprocessor 305 (a) outputs to bus 306 the data byte contained in the holding register; (b) sets the BOP flag outputted to lead 307; (c) stores the newly arrived data byte in the holding register; and (d) checks bit 0 of that byte to see if it denotes the end of the ADD field. Assuming that is the case, then preprocessor 305 sets a flag so that it will identify the next incoming data byte that it receives as the K1 byte, and hence identify the CS bits contained in that byte. Thus, preprocessor 305 temporarily stores each data byte that it receives in the holding register and then outputs that data byte to bus 306 upon receipt of the next data byte. Preprocessor 305 continues in this manner until it receives the next F flag denoting the end of the packet.

It is seen from the FIG. that BOP lead 307 extends to write control circuit 345. Write control circuit 345 responsive to the assertion of the BOP flag on lead 307 outputs an enable address latch (EAL) signal to lead 348 extending to write address latch 365. The EAL signal on lead 348 causes write address latch 365 to store in its internal register circuits the memory write address that appears on multibit bus 361. As will be seen below, this action sets the stage for discarding the incoming packet in the event that the packet's associated watermark threshold does not exceed the number of RAM 380 memory locations that are filled following the storage of the last of the packet's data bytes in RAM 380 (buffer memory), which may be, for example, a so-called dual port RAM having 1024 memory locations of 12 bits each memory location.

The assertion of BOP lead 307 also causes write control circuit 345 to disregard the first data byte that preprocessor 305 outputs to bus 306. Write control circuit 345 does this so that the address of packet switch 10 is effectively "stripped off" the incoming data packet before the latter is delivered to the next node in the data network. In fact each packet switch that is used to deliver a data packet to its final destination removes its address from the address field. The address field of a data packet thus only contains the address of its final destination when it reaches that point in the network.

When packet preprocessor 305 outputs a data byte to multibit bus 306 it also outputs a write enable (WE) signal to lead 308 extending to write control circuit 345. Except in the case of the first data byte identifying packet switch 10, write control circuit 345 responsive to to the WE signal increments write pointer register 360 via lead 347, thereby causing the RAM 380 write address that register 360 outputs to multibit bus 361 to increase by one. Write control circuit 345 then outputs to lead 346 extending to RAM 380 a write-enable strobe signal, thereby causing RAM 380 to store the data word appearing on bus 306 in the memory location identified by the address on bus 361. Thus, except as noted above, write control circuit 345 performs the foregoing each time preprocessor 305 outputs a data word to bus 306 and a write enable signal to lead 308.

Included in packet switch 10 is CS latch 335 which is used to store a copy of the class-of-service (CS) bits when they appear on bus 306. It is seen from the FIG. that two of the bit leads of bus 306 extend to CS latch 335. It is these bit leads which carry the CS bits when preprocessor 305 outputs the K1 byte to bus 306. At that time, preprocessor 305 also pulses lead 309 extending to CS latch 335. CS latch 335 responsive to that pulse, latches a copy of the CS bits into its two-bit register. CS latch 335 then supplies the bits to multiplexor 330 via two-lead bus 336. The binary value (00, 01, 10 or 11) of the CS bits is thus used to cause one of four watermark thresholds stored in registers 310, 315, 320 and 325, respectively, to be multiplexed via bus 331 to one input (B) of comparator 340.

Comparator 340 also receives at its other input (A) via bus 351 the number of RAM 380 memory locations that are filled, i.e, contain data words which have not yet been read out of RAM 380. The number of filled memory locations is determined by calculator circuit 350 using the well-known technique of modulo subtraction operating on the binary value of the RAM 380 write address appearing on bus 361 and the binary value of the RAM 380 read address appearing on bus 371. The result of that determination is then outputted to bus 351.

Comparator 340, in turn, compares the watermark threshold that it receives via bus 331 with the number that it receives via bus 351. If the value of the threshold exceeds the number, then comparator asserts lead 341 (ACC) as an indication that the data byte should be accepted. Otherwise, comparator 340 asserts lead 342 (REJ) as an indication that the data word should be rejected (discarded). However, in the illustrative embodiment of the invention, packet switch 10 does not respond to either assertion until the last data word of the incoming packet has been stored in RAM 380, as mentioned above.

In particular, when packet preprocessor 305 detects the end of a packet in the manner described above, it appends a bit (EOP) representative of that fact to the last byte of the CK2 field and then outputs the result to bus 306. It is seen from the FIG. that the bit lead of bus 306 which carries the EOP bit is extended to write control circuit 345. Write control circuit 345 responsive to the trailing edge of the EOP bit and the assertion of the write strobe pulse on lead 346 primes itself to receive the final result outputted by comparator 340 to either lead 341 or 342.

Specifically, write control circuit 345 allows the packet that was just stored in RAM 380 to remain therein if comparator 340 asserts its accept lead 341. However, write control circuit 345 rejects the packet if comparator 340 asserts its reject lead 342. Write control circuit 345 rejects (discards) the packet by transferring the contents of write address latch into registers contained in write pointer register 360. Write control circuit 345 does this by pulsing overwrite (OVW) lead 349 extended to write pointer register 360. Write pointer register 360 responsive to the pulse allows its register to be overwritten by the address priorly stored in write address latch 365 and supplied to bus 366. In this manner, the contents of write pointer register 360 is effectively returned to the address that was contained therein just prior to the loading of the first data byte (i.e., second byte of the ADD field) of the incoming packet in RAM 380.

A data packet stored in RAM 380 may be sequentially unloaded therefrom word-by-word. Node controller 20 (FIG. 1) does this by sending a read enable (RE) signal to read control circuit 355 via lead 9. Read control circuit 355 responsive to that signal increments via lead 356 the address contained in read pointer register 370. The value of the increment is, for example, a binary one as represented by a pulse on lead 356. Thereafter, responsive to the trailing edge of the RE signal on lead 9, read control circuit 355 outputs to lead 357 extended to RAM 380 a strobe pulse. RAM control circuit 380 responsive to that pulse unloads and presents to read data bus 381 the data byte stored at the location identified by the read address that pointer 370 outputs to read address bus 371. Buffer 375 accepts the data byte upon receipt of an enable signal from read control circuit via lead 358. Buffer 375 then supplies the data byte to output bus 11. Thereafter, the remaining data bytes of the packet are outputted to bus 11 responsive to receipt of respective read enable signals from controller 20.

Figure 4:
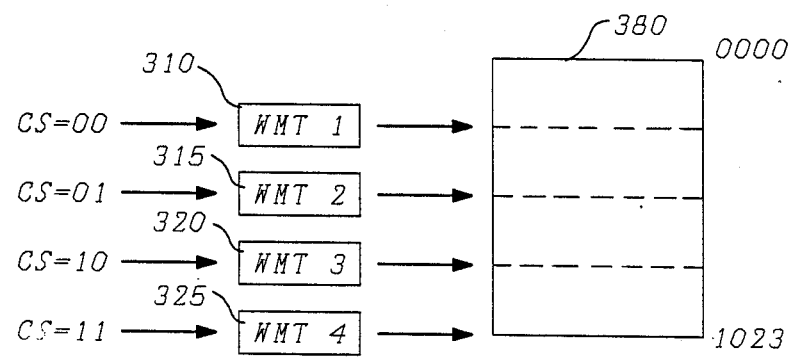
FIG. 4 is a block diagram illustrating the relationship between respective priority levels that may be assigned to a data packet and the fill level of a buffer memory contained in the packet switch of FIG. 3.

Turning now to FIG. 4, there is shown a functional block diagram illustrating the relationship between the values of the class-of-service bits and their respective watermark thresholds (WMT). As mentioned above, the binary values of the class-of-service bits identify respective priority levels in which the binary value 00 defines—illustratively the lowest priority level—and in which the binary value 11 defines—illustratively the highest priority level. It is seen from the FIG. that the priority levels 00 through 11 "point to" respective watermark thresholds WMT 1 through WMT 4, as mentioned above. The numerical designations 310, 315, 320 and 325 associated therewith are the designations of the registers shown in FIG. 3. A watermark threshold stored in one of those registers defines, more or less, a RAM 380 fill level, as depicted by the dashed lines shown in FIG. 4. For example, in a preferred embodiment of the invention, the watermark threshold associated with priority level 11 has a value of 1023.

As mentioned above, the watermark thresholds may be inputted by a system administrator positioned at terminal 15. Central processor 25 responsive to receipt of the thresholds generates a system control packet containing the (a) address of the node whose watermark thresholds are being changed, for example, the node depicted in FIG. 1, (b) new value(s) of the watermark thresholds(s), and (c) identity of the respective register 310, 315, 320 and/or 325. The data packet is then delivered to controller 20 via packet switch 10 and bus 6.

Upon receipt of the packet, controller 20 translates the address of the register whose contents are to be changed, for example, register 310, into one of four enable leads 8-1 through 8-4 connected to controller 20 via multilead cable 8 (FIG. 1). Controller 20 then loads onto bus 7 the new watermark threshold that is to be stored in that register and enables the register's enable lead, i.e., lead 8-1. Register 310 responsive to the enable signal on lead 8-1 accepts the data present on bus 7.

The foregoing is merely illustrative of the principles of the invention. Those skilled in the art will be able to devise numerous arrangements which although not explicitly shown or described herein, embody those principles and are within its scope and spirit.

We claim:
1. Apparatus comprising
 a memory having a plurality of memory locations for the storage of data words contained in respective data packets, said data packets being associated with respective levels of priority, said levels of priorty being associated with respective priorly stored memory threshold values, and
 means, responsive to the storing in individual ones of said memory locations the data words of one of said data packets, for determining the number of data words currently stored in said memory and for effectively blocking the storage of said one data packet if the value of said number exceeds the value of the memory threshold associated with the respective priority level of said one data packet.
2. The apparatus set forth in claim 1 wherein said means for determining includes means for allowing said one data packet to be stored in said memory if the value of said number is less than the value of the memory threshold associated with said one data packet.

3. The apparatus set forth in claim 1 wherein said apparatus further comprises memory read and write pointer registers, said write pointer register containing the address of the memory location at which a respective data word is to be stored and said read pointer register containing the address of the next memory location which is to be read, and wherein said number is determined as function of the contents of said read and write pointer registers.

4. The apparatus set forth in claim 1 wherein said apparatus is a packet switch arranged to receive packets of said data words from an external source of data packets, wherein each of said data packets includes a respective class-of-service mark identifying a respective one of said memory threshold values, and wherein the memory threshold that is associated with said one data word is derived from the class-of-service mark contained in the data packet associated said one data word.

5. The apparatus set forth in claim 1 wherein each of said memory threshold values is programmable and wherein said apparatus includes means for changing the value of at least one of said thresholds responsive to receipt from a user of said apparatus an instruction to do so, in which said instruction contains the new value of said at least one threshold.

6. Apparatus comprising a memory having a plurality of memory locations for the storage of respective data words each associated with a respective level of priority, and means responsive to receipt of one of said data words for storing said one data word in an individual one of said memory locations as long as the number of locations of said memory that are filled is less than a respective priorly stored memory threshold value associated with the priority level of said one data word.

7. The apparatus set forth in claim 6 wherein said means for storing includes means for blocking the storage of said one data word in said memory if the value of said number is greater than the value of said memory threshold.

8. The apparatus set forth in claim 6 wherein said apparatus further comprises memory read and write pointer registers, said read pointer register containing the address of the memory location at which said one data word is to be stored and said read pointer register containing the address of the memory location which is to be read, and wherein said number is determined as function of the contents of said read and write pointer registers.

9. The apparatus set forth in claim 6 wherein said apparatus is a packet switch arranged to receive packets of said data words from an external source of data packets, and wherein each of said data packets includes a respective class-of-service mark indicative of said a respective priority level.

* * * * *